United States Patent [19]

Kobayashi et al.

[11] Patent Number: 4,610,552
[45] Date of Patent: Sep. 9, 1986

[54] TEMPERATURE SENSOR FOR CABLES

[75] Inventors: Satoru Kobayashi; Yoshiaki Sato, both of Iruma; Haruo Imaizumi, Ohmiya, all of Japan

[73] Assignee: Junkosha Company Ltd., Tokyo, Japan

[21] Appl. No.: 629,256

[22] Filed: Jul. 9, 1984

[30] Foreign Application Priority Data

Sep. 9, 1983 [JP] Japan .................. 58-139638

[51] Int. Cl.⁴ ...................... G01K 11/08; G01R 31/08
[52] U.S. Cl. .................... 374/160; 324/58 B; 374/101; 374/117
[58] Field of Search .............. 374/160, 101; 340/596, 340/590; 324/57 PS, 58 B; 337/415, 416

[56] References Cited

U.S. PATENT DOCUMENTS

| | | | |
|---|---|---|---|
| 2,048,271 | 7/1936 | Lindsey | 337/415 |
| 2,409,359 | 10/1946 | Kaul | 337/415 |
| 2,581,213 | 1/1952 | Spooner, Jr. | 340/596 X |
| 2,974,314 | 3/1961 | Bennett et al. | 340/596 X |
| 3,406,384 | 10/1968 | Hartman et al. | 340/596 X |
| 3,510,762 | 5/1970 | Leslie | 374/110 X |
| 3,540,041 | 11/1970 | Payne | 340/596 X |
| 3,588,776 | 6/1971 | Horwinski | 337/415 |
| 3,750,012 | 7/1973 | Fellers et al. | 324/58 B X |
| 4,023,154 | 5/1977 | Comeaux | 324/52 X |
| 4,175,437 | 11/1979 | Burt | 340/596 X |
| 4,372,693 | 2/1983 | Lutz | 374/11 |
| 4,453,159 | 6/1984 | Huff et al. | 340/590 |

FOREIGN PATENT DOCUMENTS 1134532  8/1962  Fed. Rep. of Germany ........ 73/160

Primary Examiner—Daniel M. Yasich
Attorney, Agent, or Firm—Mortenson & Uebler

[57] ABSTRACT

A temperature sensor is provided comprising a conductor having a low-melting-point, a fibrous insulating layer adjacent the low-melting-point conductor and separating it from a second conductor. An oscillator applying a pulse signal to the sensor and a receiver receiving the pulse signal through the sensor can detect changes in the signal wave form due to melting or distortion of the low-melting-point conductor. The specific temperature to be sensed can be preset by providing preheating of the sensor, as by Joule heating, by passing a current through the low-melting-point conductor.

5 Claims, 6 Drawing Figures

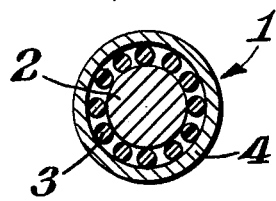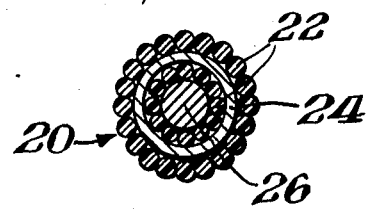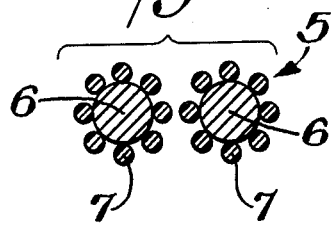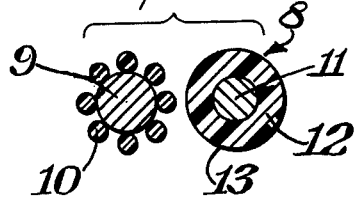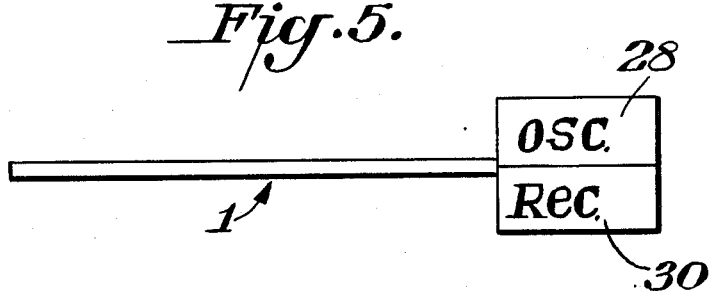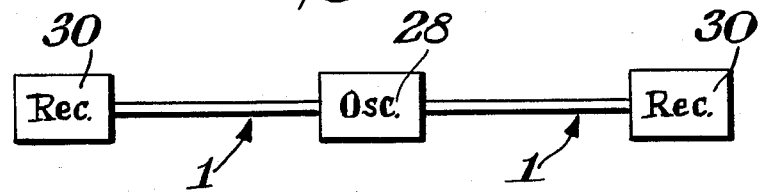

TEMPERATURE SENSOR FOR CABLES

BACKGROUND OF THE INVENTION

This device relates to a temperature sensor which can detect a specific temperature change point and its location using a cable-like temperature sensor.

A temperature-sensing cable is disclosed in Japanese Utility Model Laid-Open No. 161,713, for example. In that kind of sensing cable, a sensing circuit is opened when a meltable conductor of a low-melting point melts at a predetermined temperature, thereby sensing that temperature. That cable has drawbacks in that the sensing time is long and the sensing cable can not detect the location of the temperature change point.

SUMMARY OF THE INVENTION

A temperature sensor system is provided comprising a temperature-sensing cable having one conductor having a low-melting point, a fibrous insulating layer arranged adjacent the low-melting-point conductor and separating the low-melting-point conductor from another conductor arranged adjacent and substantially parallel to the low-melting-point conductor, an oscillator applying a pulsed electrical signal to the temperature-sensing cable, and a receiver receiving the pulse signal applied to the temperature-sensing cable, thereby sensing changes in the temperature-sensing cable due to temperature changes by a change in the signal waveform received. The system can be one wherein the temperature-sensing cable has the fibrous insulating layer arranged around the outer circumference of the low-melting-point conductor, and an external conductor is arranged around the outer circumference of the insulating layer, or the temperature sensing cable has juxtaposed a plurality of assemblies, each formed by arranging a fibrous insulating layer around the outer circumference of a low-melting-point conductor, or wherein the temperature-sensing cable is an assembly formed by arranging the fibrous insulating layer around the outer circumference of the low-melting-point conductor and this assembly is twisted with an insulated wire.

BRIEF DESCRIPTION OF THE INVENTION

FIGS. 1-4 are cross-sectional views of alternate embodiments of the temperature-sensing cable of this invention.

FIG. 5 shows a temperature-sensing cable of this invention in combination with an oscillator which sends pulse signals through the cable and a receiver which receives the pulses reflected back through the cable.

FIG. 6 shows an oscillator located at an intermediate position of the temperature-sensing cable of the invention sending pulses through the cable and receivers at both ends of the cable receiving the attenuated waves.

DETAILED DESCRIPTION OF THE INVENTION AND PREFERRED EMBODIMENTS WITH REFERENCE TO THE DRAWINGS

The present device is directed to providing a temperature sensor which can determine the specific temperature change point of a temperature-sensing cable and its location. The temperature sensor in accordance with the present invention comprises a temperature-sensing cable having a conductor of a low-melting point, a fibrous insulating layer arranged adjacent the low-melting-point conductor, and separating the low-melting-point conductor from another conductor adjacent and substantially parallel to the low-melting-point conductor. An oscillator applies a pulse signal to the temperature-sensing cable and a receiver receives the pulse signal applied to the temperature-sensing cable and senses any change in the temperature-sensing cable due to temperature, by a change of the signal waveform. In this construction, the temperature-sensing cable could be a coaxial cable formed by arranging the fibrous insulator layer around the outer circumference of the low-melting-point conductor, such as a low-melting solder, and then providing an external conductor around the outer circumference of the insulating layer. Alternatively, the cable could be formed by juxtaposing a plurality of assemblies, each consisting of a low-melting-point conductor with a fibrous insulating layer arranged around its outer circumference. It could also be a cable formed by twisting together an assembly of a low-melting-point conductor and a fibrous insulating layer arranged around the outer circumference of the conductor, with an insulated wire.

In the temperature sensor of the present device with this construction, when the low-melting-point conductor of the temperature-sensing cable undergoes thermal deformation or melts into the fibrous insulating layer around its outer circumference, the characteristic impedance between the conductor adjacent and parallel to the low-melting-point conductor changes, and transmitted pulses are reflected and attenuated at that portion, so that the heat change and the heat change point can be determined by receiving the reflected waves or transmitted attenuated waves by a receiver. This heat change can be sensed rapidly and accurately.

Hereinafter, the present device will be described in further detail with reference to the accompanying drawings.

FIG. 1 shows a section through a coaxial temperature-sensing cable 1 in accordance with the present device. This temperature-sensing cable 1 consists of a center conductor 2 which has a low-melting point, a fibrous insulating layer 3 arranged around the outer circumference of the conductor 2, and an external conductor 4 arranged around the outer circumference of the insulating layer 3.

The fibrous insulating layer 3 preferably consists of a dielectric layer of a low dielectric constant which is formed by braiding tetrafluoroethylene resin filaments, for example, but can be formed by other fibers or filaments. The external conductor 4 may consist of a transversely-wound layer of a braided conductor, a conductor wire or a conductor tape, or of a conductive resin tube.

FIG. 2 shows a section through a temperature-sensing cable 5 in accordance with another embodiment of the present device. The temperature-sensing cable 5 in this case is produced by providing a plurality (two in this case) of conductors 6 of a low-melting point adjacent to one another, and wrapping fibrous insulating layers 7 around the circumference of each conductor 6.

FIG. 3 shows a section through a temperature-sensing cable 8 in accordance with a third embodiment of the present device. The temperature-sensing cable 8 in this embodiment is produced by twisting together an assembly formed by providing a fibrous insulating layer 10 around the outer circumference of a conductor 9 of a low-melting point, with an insulating cable 13 formed by providing an insulator 12 which can be any resin insulator, or a rubber insulator, etc. around the outer circumference of a conductor 11 such as silver-plated copper wire.

FIG. 4 shows an alternate embodiment of the temperature-sensing cable of this invention 20 wherein metallic inner conductor 26 is separated from the low-melting-point outer conductor 24 by fibrous insulating material 22, the fibrous insulating material also arranged around the outside of the outer low-melting-point conductor 24.

When no heat is applied over the entire length of the temperature-sensing cables 1, 5, 8, or 20 thus produced, no deformation takes place in the low-melting-point conductor 2, 6, 9, or 24 so that the characteristic impedance between the adjacent conductors 2–4, 6—6, 9–11 or 24–26 in the sensing cable 1, 5, 8, or 20, respectively, remains constant, and no reflection and attenuation of signals occurs at intermediate points along the sensing cable 1, 5, 8, or 20 if pulses are applied to the conductors 2–4, 6—6, 9–11, or 24–26.

However, the characteristic impedance between the adjacent conductors varies when heat is applied to any portion of the temperature-sensing cables 1, 5, 8, or 20 so that the low-melting-point conductor 2, 6, 9, or 24 is softened or deformed, or is partially melted and starts to flow into the corresponding fibrous insulating layer, and the pulse signal is reflected back and attenuated at the portion. Accordingly, when pulses are applied by an oscillator 28 from one of the ends of the sensing cable across the adjacent conductors 2–4, 6—6, 9–11, or 24–26, for example, the heat change and the heat change point can be determined by either receiving reflected waves at one end by a receiver 30 as shown in FIG. 5 or by receiving attenuated waves at the other end by another receiver 30 as shown in FIG. 6. When pulses are applied by oscillator 28 from an intermediate portion of the sensing cable, the same object can be accomplished by receiving reflected waves at that intermediate portion or by receiving attenuated waves at both ends of the sensing cable by receivers 30 as shown in FIG. 6. In this manner, a heat change in the temperature-sensing cable can be determined extremely rapidly and accurately.

The temperature sensed by the present device is determined by the melting point of the low-melting-point conductor. When it is necessary to fine-tune the operating temperature to below the melting point, or detect a temperature below the melting point of the low-melting-point conductor, it is advisable to provide pre-heating by Joule heat by passing a current through the sensing wire of the device.

The temperature to be sensed can be set to 60° C. by providing preheating at 300 Watts when the material of the low-melting-point conductor is a low-melting-point solder with a specific resistance of $2 \times 10^{-5}$ Ohm$\times$cm, a specific heat of 0.05 Cal/g.°C., and a melting point of 120° C., for example, and such a sensing cable can adequately respond at 70° C., which is the temperature sensed by a fire sensor.

As described above, the present device comprises a temperature-sensing cable consisting of a conductor of a low-melting point, a fibrous insulating layer arranged adjacent the low-melting-point conductor and separating the low-melting-point conductor from another conductor arranged adjacent and substantially parallel to the low-melting-point conductor. An oscillator applies a pulse signal to the temperature-sensing cable, and a receiver receives the pulse signal transmitted through the temperature-sensing cable, and senses change of the temperature-sensing cable due to heat from a change in the signal waveform. The present device can determine a heat change rapidly and accurately.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A temperature sensor system comprising a temperature-sensing cable having a metal conductor having a low-melting point, a fibrous insulating layer arranged adjacent said low-melting-point conductor separating said low-melting point conductor from another conductor arranged adjacent and substantially parallel to said low-melting-point conductor, an oscillator applying pulsed electrical signal waveforms at a selected location of said temperature-sensing cable, and at least one receiver at a second selected location of said cable for receiving said pulse signal waveforms appllied to said temperature-sensing cable, thereby sensing changes in said temperature-sensing cable due to temperature changes which cause distortion of said low-melting-point conductor by a change in the signal waveform received by said receiver.

2. The temperature sensor system as defined in claim 1 wherein said temperature-sensing cable has said fibrous insulating layer arranged around the outer circumference of said low-melting-point conductor, and an external conductor is arranged around the outer circumference of said insulating layer.

3. The temperature sensor as defined in claim 1 wherein said temperature-sensing cable has juxtaposed a plurality of assemblies, each of said assemblies formed by arranging a fibrous insulating layer around the outer circumference of a low-melting-point conductor.

4. The temperature sensing system as defined in claim 1 wherein said temperature-sensing cable is an assembly formed by arranging said fibrous insulating layer around the outer circumference of said low-melting-point conductor and twisted with an insulated wire.

5. The temperature-sensing system of claim 1 wherein said low-melting-point conductor is oriented around the outer circumference of said insulating layer.

* * * * *